(12) United States Patent
Song et al.

(10) Patent No.: US 10,607,343 B2
(45) Date of Patent: Mar. 31, 2020

(54) DIGITAL HISTOPATHOLOGY AND MICRODISSECTION

(71) Applicant: NantOmics, LLC, Culver City, CA (US)

(72) Inventors: Bing Song, La Canada, CA (US); Gregory Chu, Los Angeles, CA (US)

(73) Assignee: NANTOMICS, LLC, Culver City, CA (US)

( * ) Notice: Subject to any disclaimer, the term of this patent is extended or adjusted under 35 U.S.C. 154(b) by 278 days.

(21) Appl. No.: 15/791,209

(22) Filed: Oct. 23, 2017

(65) Prior Publication Data

US 2018/0114317 A1 Apr. 26, 2018

Related U.S. Application Data

(60) Provisional application No. 62/557,737, filed on Sep. 12, 2017, provisional application No. 62/411,290, filed on Oct. 21, 2016.

(51) Int. Cl.
*G06T 7/00* (2017.01)
*G06K 9/62* (2006.01)
(Continued)

(52) U.S. Cl.
CPC .......... *G06T 7/0012* (2013.01); *G06K 9/0014* (2013.01); *G06K 9/4628* (2013.01);
(Continued)

(58) Field of Classification Search
None
See application file for complete search history.

(56) References Cited

U.S. PATENT DOCUMENTS

2002/0186875 A1 12/2002 Burmer et al.
2004/0093166 A1* 5/2004 Kil .......................... G01N 1/06
702/19
(Continued)

OTHER PUBLICATIONS

Rich feature hierarchies for accurate object detection and semantic segmentation Ross Girshick1 et al. Mar. 2014 (Year: 2014).*
(Continued)

*Primary Examiner* — Nancy Bitar
(74) *Attorney, Agent, or Firm* — Mauriel Kapouytian Woods LLP; Liang Huang; Andrew A. Noble

(57) ABSTRACT

A computer implemented method of generating at least one shape of a region of interest in a digital image is provided. The method includes obtaining, by an image processing engine, access to a digital tissue image of a biological sample; tiling, by the image processing engine, the digital tissue image into a collection of image patches; identifying, by the image processing engine, a set of target tissue patches from the collection of image patches as a function of pixel content within the collection of image patches; assigning, by the image processing engine, each target tissue patch of the set of target tissue patches an initial class probability score indicating a probability that the target tissue patch falls within a class of interest, the initial class probability score generated by a trained classifier executed on each target tissue patch; generating, by the image processing engine, a first set of tissue region seed patches by identifying target tissue patches having initial class probability scores that satisfy a first seed region criteria, the first set of tissue region seed patches comprising a subset of the set of target tissue patches; generating, by the image processing engine, a second set of tissue region seed patches by identifying target tissue patches having initial class probability scores that satisfy a second seed region criteria, the second set of tissue region seed patches comprising a subset of the set of target
(Continued)

tissue patches; calculating, by the image processing engine, a region of interest score for each patch in the second set of tissue region seed patches as a function of initial class probability scores of neighboring patches of the second set of tissue region seed patches and a distance to patches within the first set of issue region seed patches; and generating, by the image processing engine, one or more region of interest shapes by grouping neighboring patches based on their region of interest scores.

44 Claims, 16 Drawing Sheets
(4 of 16 Drawing Sheet(s) Filed in Color)

(51) Int. Cl.
| G06N 3/04 | (2006.01) |
| G06T 7/11 | (2017.01) |
| G06N 7/00 | (2006.01) |
| G06K 9/46 | (2006.01) |
| G06K 9/00 | (2006.01) |
| G06T 7/187 | (2017.01) |
| G06N 20/00 | (2019.01) |

(52) U.S. Cl.
CPC ......... *G06K 9/4642* (2013.01); *G06K 9/6217* (2013.01); *G06K 9/6223* (2013.01); *G06K 9/6227* (2013.01); *G06K 9/6265* (2013.01); *G06K 9/6269* (2013.01); *G06K 9/6272* (2013.01); *G06K 9/6276* (2013.01); *G06K 9/6278* (2013.01); *G06K 9/6296* (2013.01); *G06N 3/04* (2013.01); *G06N 3/0454* (2013.01); *G06N 7/005* (2013.01); *G06T 7/11* (2017.01); *G06T 7/187* (2017.01); *G06N 20/00* (2019.01); *G06T 2207/10056* (2013.01); *G06T 2207/20021* (2013.01); *G06T 2207/20084* (2013.01); *G06T 2207/20156* (2013.01); *G06T 2207/30024* (2013.01)

(56) References Cited

U.S. PATENT DOCUMENTS

| 2009/0116737 | A1 | 5/2009 | Kiraly et al. |
| 2009/0262993 | A1* | 10/2009 | Kotsianti ........... G06K 9/00127 382/128 |
| 2015/0110381 | A1 | 4/2015 | Parvin et al. |
| 2015/0213302 | A1 | 7/2015 | Madabhushi et al. |
| 2016/0110584 | A1 | 4/2016 | Remiszewski et al. |
| 2018/0070905 | A1* | 3/2018 | El-Baz ................. G06T 7/0016 |

OTHER PUBLICATIONS

International Search Report and Written Opinion issued in International Application No. PCT/US2017/057925 dated Feb. 6, 2018, 12 pages.
Xu et al., "Efficient Lung Cancer Cell Detection with Deep Convolution Neural Network," International Workshop on Patch-based Techniques in Medical Imaging, 2015, pp. 79-86.
Pan et al., "An Effective Approach for Robust Lung Cancer Cell Detection," International Workshop on Patch-based Techniques in Medical Imaging, 2015, pp. 87-94.
Li et al., "Fast Regions-of-Interest Detection in Whole Slide Histopathology Images," International Workshop on Patch-based Techniques in Medical Imaging, 2015, pp. 120-127.
Yao et al., "Computer-Assisted Diagnosis of Lung Cancer Using Quantitative Topology Features," International Workshop on Machine Learning in Medical Imaging, 2015, pp. 288-295.
Jiang et al., "Joint Kernel-Based Supervised Hashing for Scalable Histopathological Image Analysis," International Conference on Medical Image Computing and Computer-Assisted Intervention, 2015, pp. 366-373.
Cruz-Roa et al., "Automatic detection of invasive ductal carcinoma in whole slide images with Convolutional Neural Networks," Medical Imaging 2014: Digital Pathology, vol. 9041, 15 pages.
Huang, "Imaging Genomics Based Lung Cancer Clinical Outcome Prediction," http://ranger.uta.edu/~huang/R_Lung.htm, downloaded on Sep. 8, 2016, 2 pages.
"Cell Detection Demo," https://celldetection.zhengxu.work/, downloaded on Sep. 8, 2016, 1 page.
Szegedy et al., "Rethinking the Inception Architecture for Computer Vision," Proceedings of the IEEE Conference on Computer Vision and Pattern Recognition, 2016, 10 pages.
Krahenbuhl et al., "Efficient Inference in Fully Connected CRFs with Gaussian Edge Potentials," NIPS, 9 pages.
Long et al., "Fully Convolutional Networks for Semantic Segmentation," Proceedings of the IEEE Conference on Computer Vision and Pattern Recognition, 2015, pp. 3431-3440.
The International Search Report and Written Opinion issued in International Application No. PCT/US2018/050737 dated Jan. 18, 2019, 13 pages.
Girshick et al., "Rich feature hierarchies for accurate object detection and semantic segmentation," Proceedings of the IEEE conference on computer vision and pattern recognition, 2014, 8 pages.
Senf et al., "Comparison of One-Class SVM and Two-Class SVM for Fold Recognition," International Conference on Neural Information Processing, 2006, 10 pages.

* cited by examiner

| type | patch size/stride or remarks | input size |
|---|---|---|
| conv | 3×3/2 | 299×299×3 |
| conv | 3×3/1 | 149×149×32 |
| conv padded | 3×3/1 | 147×147×32 |
| pool | 3×3/2 | 147×147×64 |
| conv | 3×3/1 | 73×73×64 |
| conv | 3×3/2 | 71×71×80 |
| conv | 3×3/1 | 35×35×192 |
| 3×Inception | As in figure 5 | 35×35×288 |
| 5×Inception | As in figure 6 | 17×17×768 |
| 2×Inception | As in figure 7 | 8×8×1280 |
| pool | 8 × 8 | 8 × 8 × 2048 |
| linear | logits | 1 × 1 × 2048 |
| softmax | classifier | ~~1 × 1 × 1000~~ 1 X 1 X 2 |

*Figures 5, 6 and 7 refer to
"Rethinking the Inception Architecture for Computer Vision"
by Szegedy

| Rows | | | | | |
|---|---|---|---|---|---|
| 5 | 0.3 | 0.2 | 0.3 | 0.1 | 0.2 |
| 4 | 0.4 | 0.9 | 0.95 | 0.3 | 0.4 |
| 3 | 0.5 | 0.5 | 0.97 | 0.7 | 0.5 |
| 2 | 0.3 | 0.8 | 0.65 | 0.9 | 0.7 |
| 1 | 0.4 | 0.2 | 0.1 | 0.2 | 0.05 |
| | 1 | 2 | 3 | 4 | 5 |

Columns

FIG. 9B

| | 1 | 2 | 3 | 4 | 5 |
|---|---|---|---|---|---|
| 5 | 0.3 | 0.2 | 0.3 | 0.1 | 0.2 |
| 4 | 0.4 | <u>0.9</u> | <u>0.95</u> | 0.3 | 0.4 |
| 3 | 0.5 | 0.5 | <u>0.97</u> | 0.7 | 0.5 |
| 2 | 0.3 | 0.8 | 0.65 | <u>0.9</u> | 0.7 |
| 1 | 0.4 | 0.2 | 0.1 | 0.2 | 0.05 |

Rows (vertical axis), Columns (horizontal axis)

FIG. 9C

|   | 1 | 2 | 3 | 4 | 5 |
|---|---|---|---|---|---|
| 5 | 0.3 | 0.2 | 0.3 | 0.1 | 0.2 |
| 4 | 0.4 | 0.9 | 0.95 | 0.3 | 0.4 |
| 3 | 0.5 | 0.5 | 0.97 | 0.7 | 0.5 |
| 2 | 0.3 | 0.8 | 0.65 | 0.9 | 0.7 |
| 1 | 0.4 | 0.2 | 0.1 | 0.2 | 0.05 |

Rows / Columns

FIG. 9D

|       | 1    | 2   | 3    | 4   | 5    |
|-------|------|-----|------|-----|------|
| 5     | 0.3  | 0.2 | 0.3  | 0.1 | 0.2  |
| 4     | 0.4  | 0.9 | 0.95 | 0.3 | 0.4  |
| 3     | 0.5  | 0.5 | 0.97 | 0.7 | 0.5  |
| 2     | 0.3  | 0.8 | 0.65 | 0.9 | 0.7  |
| 1     | 0.4  | 0.2 | 0.1  | 0.2 | 0.05 |

Rows / Columns

FIG. 9E

|   | 1 | 2 | 3 | 4 | 5 |
|---|---|---|---|---|---|
| 5 | 0.3 | 0.2 | 0.3 | 0.1 | 0.2 |
| 4 | 0.4 | 0.9 | 0.95 | 0.3 | 0.4 |
| 3 | 0.5 | 0.5 | 0.97 | 0.7 | 0.5 |
| 2 | 0.3 | 0.8 | 0.65 | 0.9 | 0.7 |
| 1 | 0.4 | 0.2 | 0.1 | 0.2 | 0.05 |

Rows / Columns

FIG. 9F

Conditional Random Field Model

- Gibbs Energy $$E(\mathbf{x}) = \sum_i \psi_u(x_i) + \sum_{i<j} \psi_p(x_i, x_j),$$

$$\psi_p(x_i, x_j) = \mu(x_i, x_j) \underbrace{\sum_{m=1}^{K} w^{(m)} k^{(m)}(\mathbf{f}_i, \mathbf{f}_j)}_{k(\mathbf{f}_i, \mathbf{f}_j)},$$

$$k(\mathbf{f}_i, \mathbf{f}_j) = \underbrace{w^{(1)} \exp\left(-\frac{|p_i - p_j|^2}{2\theta_\alpha^2} - \frac{|I_i - I_j|^2}{2\theta_\beta^2}\right)}_{\text{appearance kernel}} + \underbrace{w^{(2)} \exp\left(-\frac{|p_i - p_j|^2}{2\theta_\gamma^2}\right)}_{\text{smoothness kernel}}.$$

$p$ is patch pixel location, $I$ feature vector.
$u = 1$ if neighbor in different class. Otherwise is 0

FIG. 10

DIGITAL HISTOPATHOLOGY AND MICRODISSECTION

CROSS REFERENCE TO RELATED APPLICATIONS

This application claims the benefit of priority to U.S. Provisional Application No. 62/411,290, filed Oct. 21, 2016, and U.S. Provisional Application No. 62/557,737, filed Sep. 12, 2017. These and all other extrinsic materials referenced herein are incorporated by reference in their entirety.

INTRODUCTION

The present technology relates generally to histopathology, the microscopic examination of tissue for the purpose of determining whether the tissue is diseased and/or studying diseased tissue. The tissue may be removed from any part of the body including, for example, breast lumps, specimens of bowel, kidney, liver, uterus lining, lung, chest, lymph node, muscle, nerve, skin, testicle, thyroid, or the like.

This disclosed technology relates to identifying regions of interest within a digital image, for example, identifying foreground objects from background scenes, or identifying cancer cells within a digital histopathology image.

The tissue may be collected from a subject in multiple settings including biopsy, surgery, or autopsy. After tissues are removed from the subject, they are prepared for chemical fixation by being placed in a fixative such as formalin to prevent decay of the tissue. The tissues are then either frozen or set in molten wax. Sections of the tissues are then cut and placed on slides Once the tissue sections are on slides, a pathologist views the slides through a microscope to determine whether the tissue is diseased and, if diseased, determine the stage of the disease. For example, a pathologist may determine whether a breast lump includes breast cancer cells and, if it does, a pathologist may determine the grade and/or stage of cancer. However, there is a technical problem with these determinations in that they are often unreliable, expensive, time consuming, and generally require verification by multiple pathologists to minimize the likelihood of false determinations, including false positives as well as false negatives.

Embodiments of the present invention solve the above technical problem and provide a technical solution of using neural networks and, more specifically, convolutional neural networks, to determine whether tissue is likely to be diseased.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 illustrates layers of a convolutional neural network with a layer modified for use with an embodiment of the invention;

FIGS. 9A-9F illustrate diagrams showing a plurality of patches of tissue to be processed by an electronic device that implements one or more aspects of an embodiment of the invention;

FIG. 10 illustrates a Conditional Random Field Model, which, in an alternative embodiment, can be used in place of or in addition to at least some steps of the embodiment of FIG. 6;

While the invention is described with reference to the above drawings, the drawings are intended to be illustrative, and the invention contemplates other embodiments within the spirit of the invention.

DETAILED DESCRIPTION OF EMBODIMENTS OF THE PRESENT INVENTION

The present invention will now be described more fully hereinafter with reference to the accompanying drawings which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as devices or methods. Accordingly, the present invention may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrases "in one embodiment," "in an embodiment," and the like, as used herein, does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" includes plural references. The meaning of "in" includes "in" and "on."

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Figure 1:
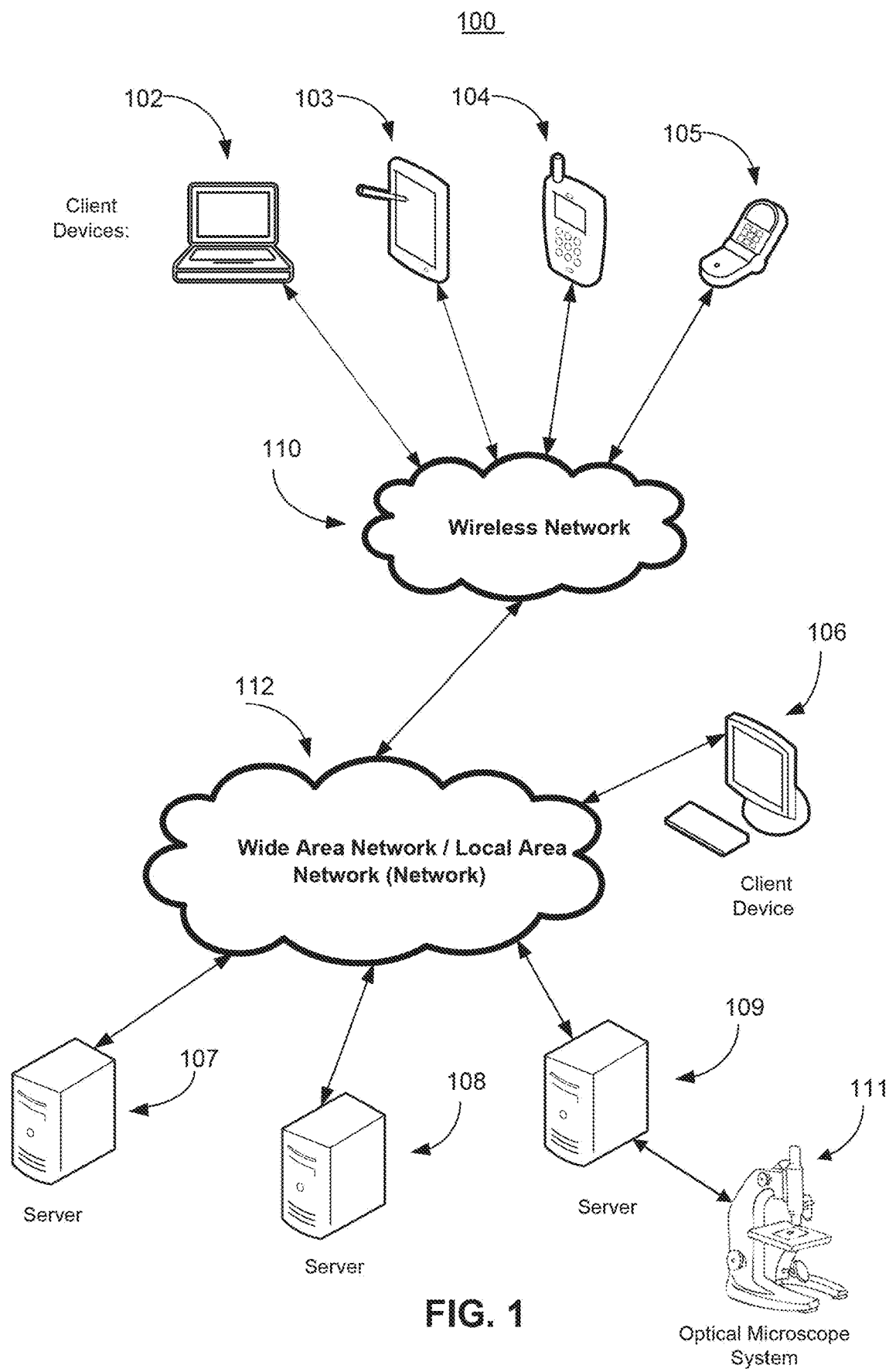
FIG. 1 illustrates a block diagram of a distributed computer system that can implement one or more aspects of an embodiment of the present invention.

FIG. 1 illustrates components of one embodiment of an environment in which the invention may be practiced. Not all of the components may be required to practice the invention, and variations in the arrangement and type of the components may be made without departing from the spirit or scope of the invention. As shown, the system 100 includes one or more Local Area Networks ("LANs") / Wide Area Networks ("WANs") 112, one or more wireless networks 110, one or more wired or wireless client devices 106, mobile or other wireless client devices 102-106, servers 107-109, optical microscope system 111, and may include or communicate with one or more data stores or databases. Various of the client devices 102-106 may include, for example, desktop computers, laptop computers, set top boxes, tablets, cell phones, smart phones, and the like. The servers 107-109 can include, for example, one or more application servers, content servers, search servers, and the like.

Figure 2:
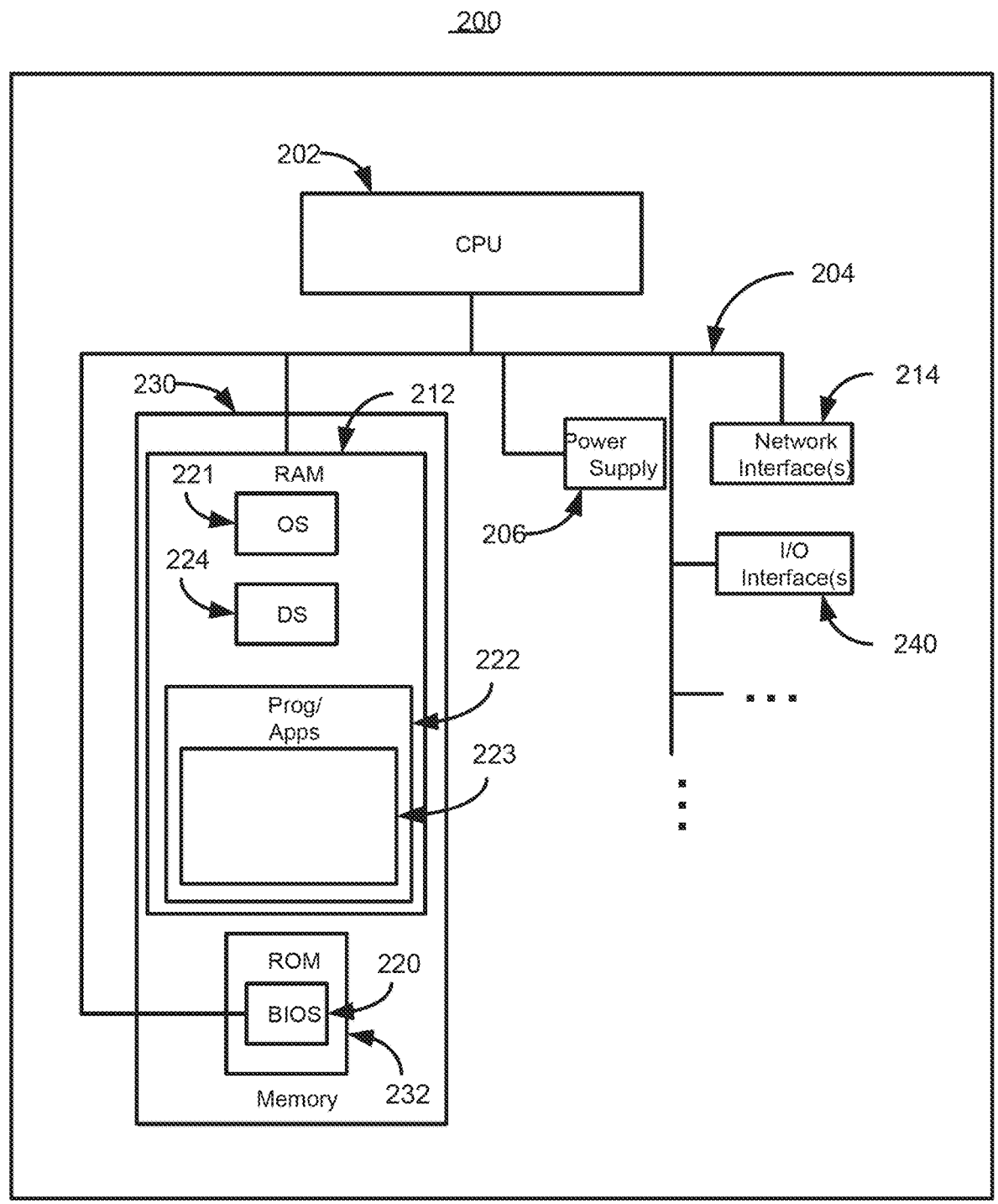
FIG. 2 illustrates a block diagram of an electronic device that can implement one or more aspects of an embodiment of the invention.

Optical microscope system 111 may include a microscope, an ocular assembly, a camera, a slide platform, as well as components of electronic device 200 as shown in FIG. 2. Although FIG. 2 shows optical microscope system 111 being communicatively coupled to server 109, it may also be coupled to any or all of servers 107-109, network 112, wireless network 110, and/or any of client devices 102-106.

FIG. 2 illustrates a block diagram of an electronic device 200 that can implement one or more aspects of systems and methods for interactive video generation and rendering according to one embodiment of the invention. Instances of the electronic device 200 may include servers, e.g., servers 107-109, optical microscope system 111, and client devices, e.g., client devices 102-106. In general, the electronic device 200 can include a processor/CPU 202, memory 230, a power supply 206, and input/output (I/O) components/devices 240, e.g., microphones, speakers, displays, touchscreens, keyboards, mice, keypads, microscopes, GPS components, etc., which may be operable, for example, to provide graphical user interfaces.

A user may provide input via a touchscreen of an electronic device 200. A touchscreen may determine whether a user is providing input by, for example, determining whether the user is touching the touchscreen with a part of the user's body such as his or her fingers. The electronic device 200 can also include a communications bus 204 that connects the aforementioned elements of the electronic device 200. Network interfaces 214 can include a receiver and a transmitter (or transceiver), and one or more antennas for wireless communications.

The processor 202 can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software.

The memory 230, which can include Random Access Memory (RAM) 212 and Read Only Memory (ROM) 232, can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system 221, data storage 224, which may include one or more databases, and programs and/or applications 222, which can include, for example, software aspects of the digital histopathology and microdissection system 223. The ROM 232 can also include Basic Input/Output System (BIOS) 220 of the electronic device.

Software aspects of the digital histopathology and microdissection system 223 is intended to broadly include or represent all programming, applications, algorithms, software and other tools necessary to implement or facilitate methods and systems according to embodiments of the invention. The elements of systems and methods for interactive video generation and rendering program may exist on a single server computer or be distributed among multiple computers, servers, devices or entities, which can include advertisers, publishers, data providers, etc. If the systems and methods for interactive video generation and rendering program is distributed among multiple computers, servers, devices or entities, such multiple computers would communicate, for example, as shown on FIG. 1.

The power supply 206 contains one or more power components, and facilitates supply and management of power to the electronic device 200.

The input/output components, including Input/Output (I/O) interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the systems and methods for interactive video generation and rendering, via a network to another device. Also, an application server may, for example, host a Web site that can provide a user interface for administration of example aspects of the systems and methods for interactive video generation and rendering.

Any computing device capable of sending, receiving, and processing data over a wired and/or a wireless network may act as a server, such as in facilitating aspects of implementations of the systems and methods for interactive video generation and rendering. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like.

A server may include, for example, a device that is configured, or includes a configuration, to provide data or content via one or more networks to another device, such as in facilitating aspects of an example systems and methods for interactive video generation and rendering. One or more servers may, for example, be used in hosting a Web site, such as the web site www.microsoft.com. One or more servers may host a variety of sites, such as, for example, business sites, informational sites, social networking sites, educational sites, wilds, financial sites, government sites, personal sites, and the like.

Servers may also, for example, provide a variety of services, such as Web services, third-party services, audio services, video services, email services, HTTP or HTTPS services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for interactive video generation and rendering. Content may include, for example, text, images, audio, video, and the like.

In example aspects of the systems and methods for interactive video generation and rendering, client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers, integrated devices combining one or more of the preceding devices, and the like.

Client devices, as may be used in example systems and methods for interactive video generation and rendering, may range widely in terms of capabilities and features. For example, a cell phone, smart phone or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, GPS or other location-aware capability, and a 2D or 3D touch-sensitive color screen on which both text and graphics may be displayed.

Client devices, such as client devices 102-106, for example, as may be used in example systems and methods for interactive video generation and rendering, may run a variety of operating systems, including personal computer operating systems such as Windows, iOS or Linux, and mobile operating systems such as iOS, Android, Windows Mobile, and the like. Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending and receiving messages via email, SMS, or MMS, playing games (such as fantasy sports leagues), receiving advertising, watching locally stored or streamed video, or participating in social networks.

In example aspects of the systems and methods for interactive video generation and rendering, one or more networks, such as networks 110 or 112, for example, may couple servers and client devices with other computing devices, including through wireless network to client devices. A network may be enabled to employ any form of computer readable media for communicating information from one electronic device to another. A network may include the Internet in addition to Local Area Networks (LANs), Wide Area Networks (WANs), direct connections, such as through a Universal Serial Bus (USB) port, other forms of computer-readable media, or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, optic fiber links, or other communications links known to those skilled in the art. Furthermore, remote computers and other related electronic devices could be remotely connected to either LANs or WANs via a modem and a telephone link.

A wireless network, such as wireless network 110, as in example systems and methods for interactive video generation and rendering, may couple devices with a network. A wireless network may employ stand-alone ad-hoc networks, mesh networks, Wireless LAN (WLAN) networks, cellular networks, and the like.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, and the like. Access technologies such as 2G, 2.5G, 3G, 4G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like.

Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), Wide Area Networks (WANs), wireless networks, and long haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

The header of the packet may include, for example, the source port (16 bits), destination port (16 bits), sequence number (32 bits), acknowledgement number (32 bits), data offset (4 bits), reserved (6 bits), checksum (16 bits), urgent pointer (16 bits), options (variable number of bits in multiple of 8 bits in length), padding (may be composed of all zeros and includes a number of bits such that the header ends on a 32 bit boundary). The number of bits for each of the above may also be higher or lower.

A "content delivery network" or "content distribution network" (CDN), as may be used in example systems and methods for interactive video generation and rendering, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's Web site infrastructure, in whole or in part, on the third party's behalf.

A Peer-to-Peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

One embodiment of the present invention includes systems, methods, and a non-transitory computer readable storage medium or media tangibly storing computer program logic capable of being executed by a computer processor, related to digital histopathology and microdissection.

As mentioned above, requiring multiple pathologists to review and make determinations as to whether a tissue sample ("sample") is diseased or, in particular, diseased with cancer is unreliable, expensive, and time consuming.

An embodiment of the present invention includes determining whether a sample is diseased. The embodiment described below refers, in particular, to cancer. However, embodiments of the present invention may be used to make a determination as to other diseases.

An embodiment of the present invention relates to determining whether a sample is cancerous by using computer vision. Computer vision relates to the automated extraction, analysis and understanding of useful information from one or more digital images. For example, computer vision may be used to determine the age of a person in a photograph by determining the location of a face of a person in a digital image, determining the location of the eyes of such person, and measuring the interpupillary distance of such person.

In the field of machine learning, a Convolutional Neural Network ("CNN") is an artificial neural network which may be used in the field of computer vision. The article Rethinking the Inception Architecture for Computer Vision by Christian Szegedy et al. (arXiv:1512.00567v3 [cs.CV] 11 Dec. 2015) discusses the use of CNNs in computer vision. The CNN has a plurality of layers, as shown in FIG. 5, and a plurality of parameters in each layer (input size). FIG. 5 includes information on the type of layer, the patch size and the input size of each layer. The values of the parameters determine the output of the CNN.

The CNN may be provided an input of an image of a tissue sample and the CNN may provide, as an output, a probability of whether said image is cancer or non-cancer. The image of the tissue sample may be a slide image and, in particular, a digital histopathology image. Prior to the CNN making such determination, according to an embodiment of the present invention, a CNN may be trained using related images (i.e., images of cancer cells and images without cancer cells).

Figure 3:
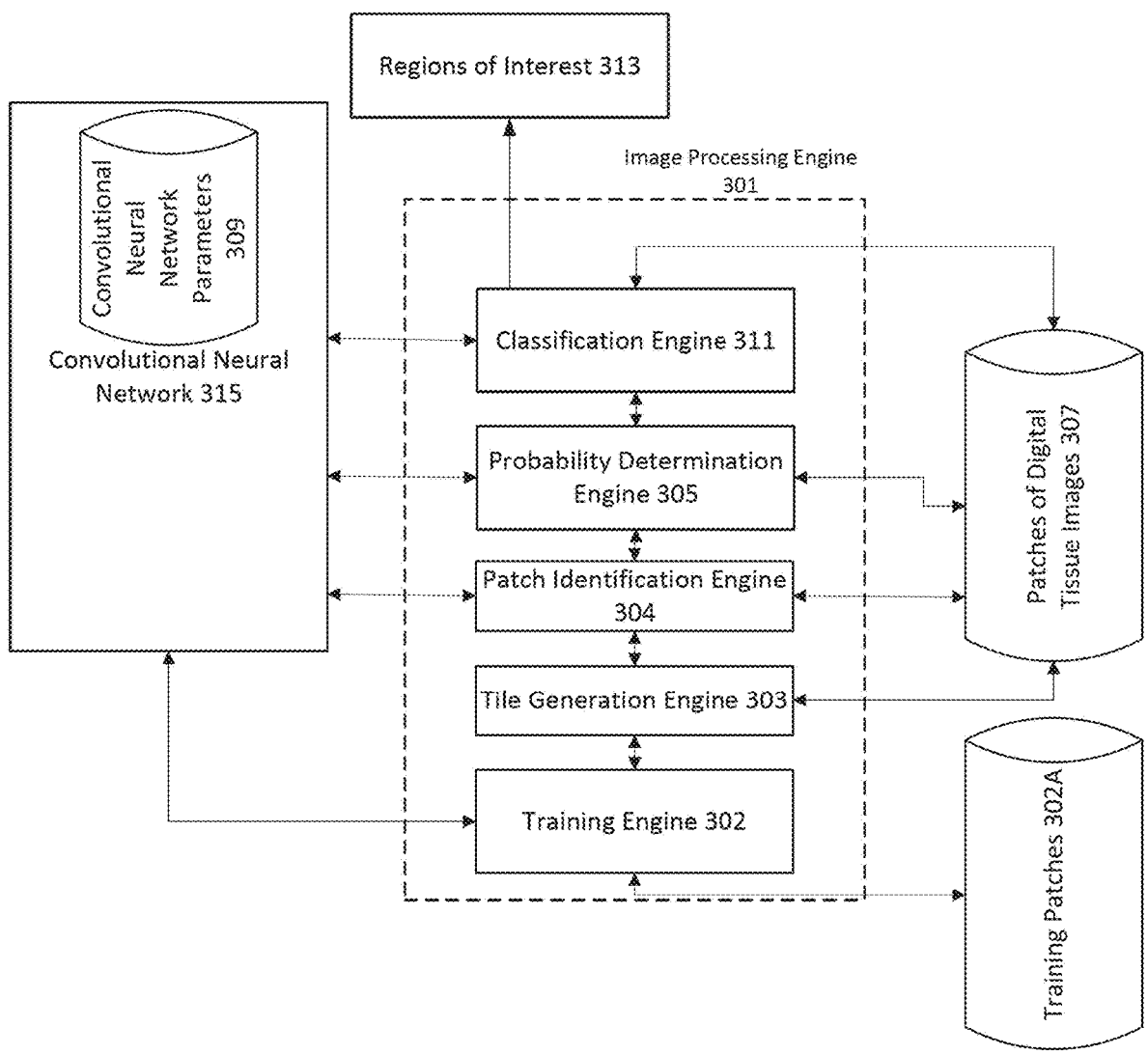
FIG. 3 illustrates an architecture diagram of an electronic device that can implement one or more aspects of an embodiment of the invention.

FIG. 3 illustrates an architecture diagram of an electronic device that can implement one or more aspects of an embodiment of the invention. FIG. 3 includes image processing engine 301. Image processing engine 301 may be implemented by programs and/or applications 222 of FIG. 2, which can include, for example, software aspects of the digital histopathology and microdissection system 223. Image processing engine 301 includes training engine 302, which trains CNN 315.

Figure 4:
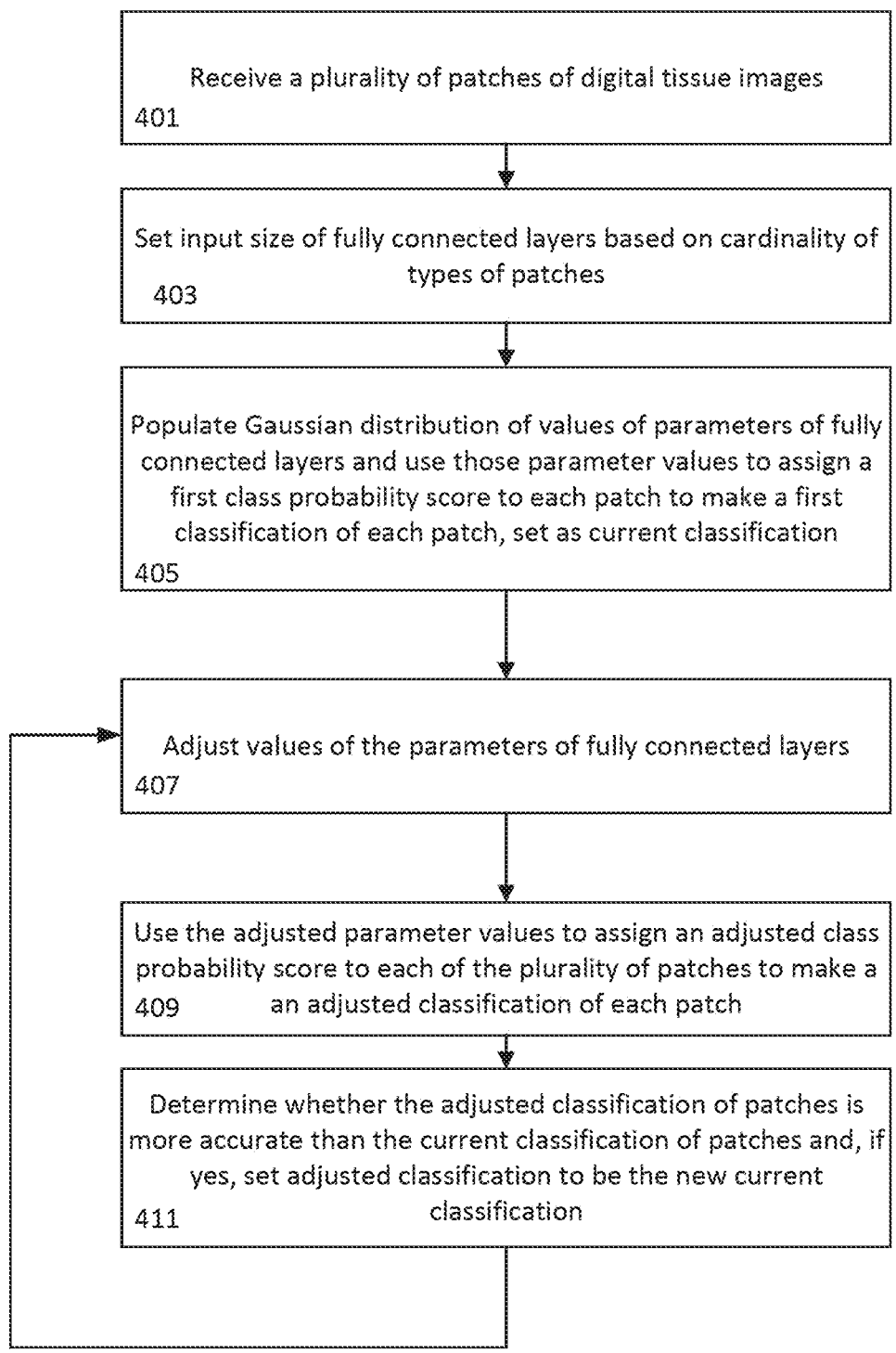
FIG. 4 illustrates a process carried out by an electronic device that can implement one or more aspects of an embodiment of the invention.

FIG. 4 illustrates the CNN training process carried out by training engine 302. As shown in FIG. 4, training of the CNN 315 by the training engine 302 includes a number of steps. In step 401, CNN 315 receives a plurality of patches of digital tissue images of different types/groups, The plurality of patches may, for example, include a plurality of normal patches and a plurality of positive patches (training patches 302A). The training patches 302A are portions of a larger image. In this case, the larger image may be a digital image of a biological sample which may have positive and normal patches. The training patches may also come from multiple larger images. Positive patches are patches which are known to be cancer and normal patches are patches which are known to be non-cancer (i.e., they may have previously been determined by pathologists or computer vision to be either cancer or non-cancer). The types of cancer may include, but are not necessarily limited to, breast cancer, bladder cancer, brain cancer, lung cancer, pancreatic cancer, skin cancer, colorectal cancer, prostate cancer, stomach cancer, liver cancer, cervical cancer, esophageal cancer, leukemia, non-hodgkin lymphoma, kidney cancer, uterine cancer, bile duct cancer, bone cancer, ovarian cancer, gallbladder cancer, gastrointestinal cancer, oral cancer, throat cancer, ocular cancer, pelvic cancer, spinal cancer, testicular cancer, vaginal cancer, vulvar cancer, and thyroid cancer.

In step 401, the training engine 302 may provide as input to the not yet trained classifier of the CNN 315 a large number of normal patches and a large number of positive patches (training patches 302A) (for example 1000, 5000, 10000, 20000, 30000, 40000, 50000, 75000, or 100000 positive patches and an equal number, an unequal number, or a substantially similar number (such as a number within 1%, 3%, 5% or 10%) of normal patches) to train the CNN 315 in recognizing patches with characteristics similar to the input patches. If there is an insufficient number of unique normal or positive patches, the training engine 302 may duplicate a randomly selected (or patch selected by a user) existing training patch in the particular group of patches (i.e., positive or normal) and modify the patch. For example, the patch may be modified by rotating it 90, 180 or 270 degrees and/or the color scheme of the patch may be modified and/or a distortion may be added to the patch and/or the patch may be converted to greyscale and/or a portion of the patch may be cropped out and/or the patch may be flipped and/or the patch may be resized. Training patches can be subjected to a transform that can include: rotation, skewing, affine, translation, mirror image, etc. As mentioned above, a random patch may be selected and then a random modification scheme may be applied. Where a variable is involved (such as degrees rotation), a random number may be used to select the value of the variable.

The resulting trained classifier of the CNN 315 may be at least one of the following types of classifiers: support vector machine, softmax, decision tree, random forest, k nearest neighbor, Linear and Quadratic Discriminant Analysis, Ridge Regression. MultiLayer Perceptron (MLP), Hyperpipes, Bayes net, k-means clustering and/or naïve bayes.

In addition to providing a plurality of normal patches and positive patches, for each patch, the training engine 302 provides the CNN 315 values of the correct output for each patch. For example, a 0 may be provided if the patch is normal and a 1 is provided if the patch is positive (i.e., cancer or another disease).

In step 403, the training engine 302 sets, in the CNN 315, an input size of one or more fully connected layers of the CNN 315 architecture to a new value, the new value being determined based on a cardinality of types of patches in the plurality of patches. For example, in the case of two types of patches, normal and positive, the cardinality of types of patches would be 2. More specifically, the input size of the softmax layer of the CNN 315, as shown in the last row of FIG. 5, may be set to 1×1×2.

In step 405, the training engine 302 populates, in the CNN 315, a distribution of values of parameters of the one or more fully connected layers (e.g., CNN parameters 309). The distribution of values may be a Gaussian distribution, a Poisson distribution, or a user generated distribution. The CNN parameters 309 determine how the CNN classifies based on its training.

A plurality of patches may then be input by the training engine 302 into the CNN 315 and the initial class probability scores of each patch are generated by the CNN 315 and stored in a memory (first initial class probability scores of the plurality of patches). The initial class probability score indicates a probability that a particular patch falls within a group of normal patches or a group of positive patches (to make a first classification of each patch). Step 405 sets the first classification as the current classification.

In step 407, the training engine 302 adjusts, in the CNN 315, the values of the parameters 309 of the one or more fully connected layers.

In step 409, after the adjustment of values of the parameters in step 407, a plurality of patches are input by the training engine 302 into the CNN 315 and class probability scores of each patch are determined after adjustment and assigned by CNN 315 and stored in a memory as adjusted class probability scores (to make an adjusted classification of the plurality of patches). The class probability score of a pre-adjustment (or before the latest adjustment) patch may be referred to as the first initial class probability score and the probability score of a post-adjustment patch may be referred to as the second initial class probability score Then, in step 411, training engine 302 determines whether the adjusted class probability scores (sometimes referred to as the first initial class probability scores) of the plurality of patches are more accurate than the current class probability scores (sometimes referred to as the second initial class probability scores) of the plurality of patches. That is, in step 411, it is determined whether the parameters adjusted in step 407 produce more accurate probabilities than did the parameter values used prior to the adjustment in step 407. The determination of step 411 may include determining that a sum of squares of a difference between the adjusted class probability scores of the plurality of patches and a correct initial class probability scores of the plurality of patches is lower than a sum of squares of a difference between the current class probability scores of the plurality of patches and the correct initial class probability scores of the plurality of patches. If the adjusted class probability scores are determined to be more accurate than the current class probability scores, then the adjusted classification is set to be the new current classification. The process can return to step 407 from step 411 and continue iterating steps 407-411. That is, the parameters may be adjusted multiple times to find the best set of parameters.

Once the CNN has been trained according to the process in FIG. 4 and the optimal parameters have been set/adjusted, the CNN may then be used to determine initial class probabilities for patches of images of biological samples for which the probabilities are unknown. That is, once the classifier is trained, it is ready for use with "test" patches. Test patches are patches from an actual, live patient's tissue sample.

Figure 6:
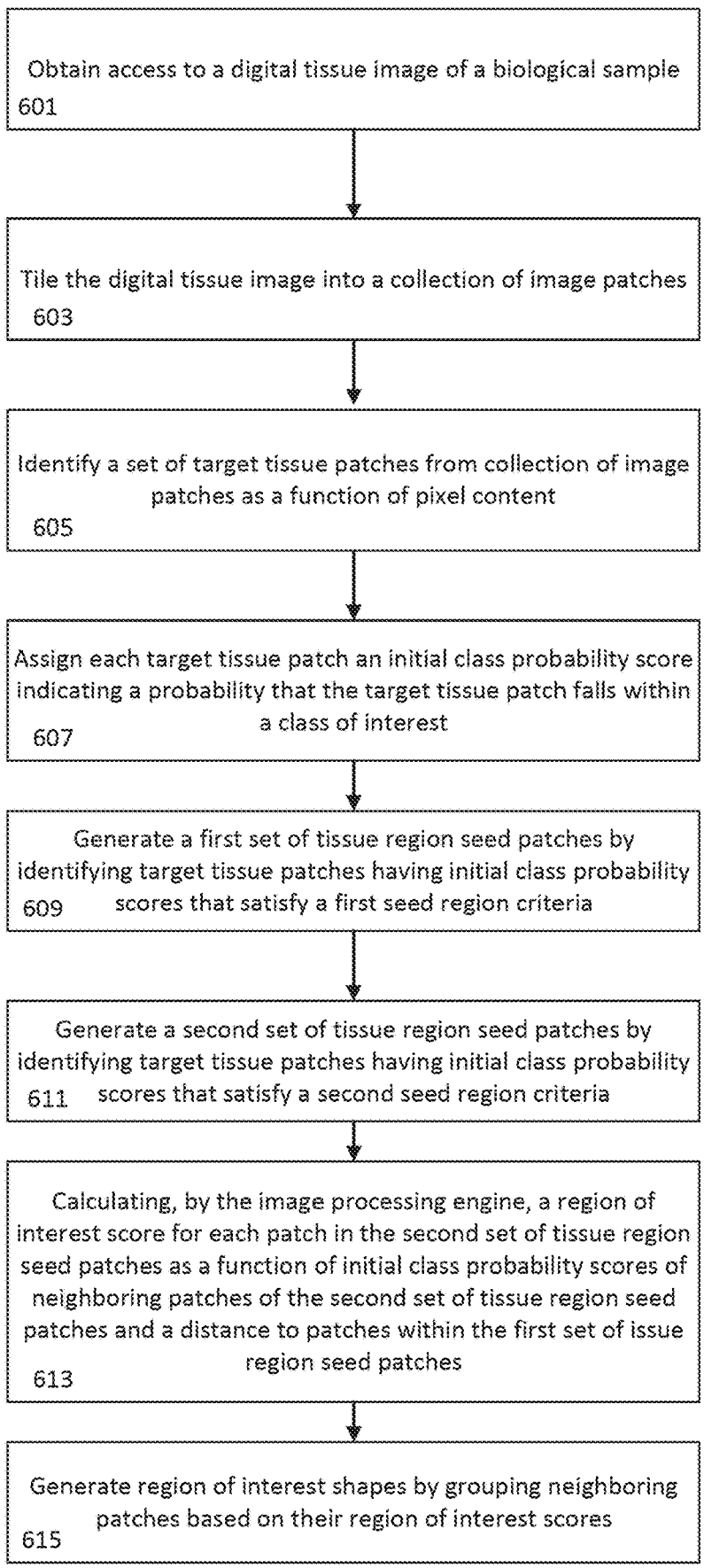
FIG. 6 illustrates a process carried out by an electronic device that implements one or more aspects of an embodiment of the invention.
Figure 7:
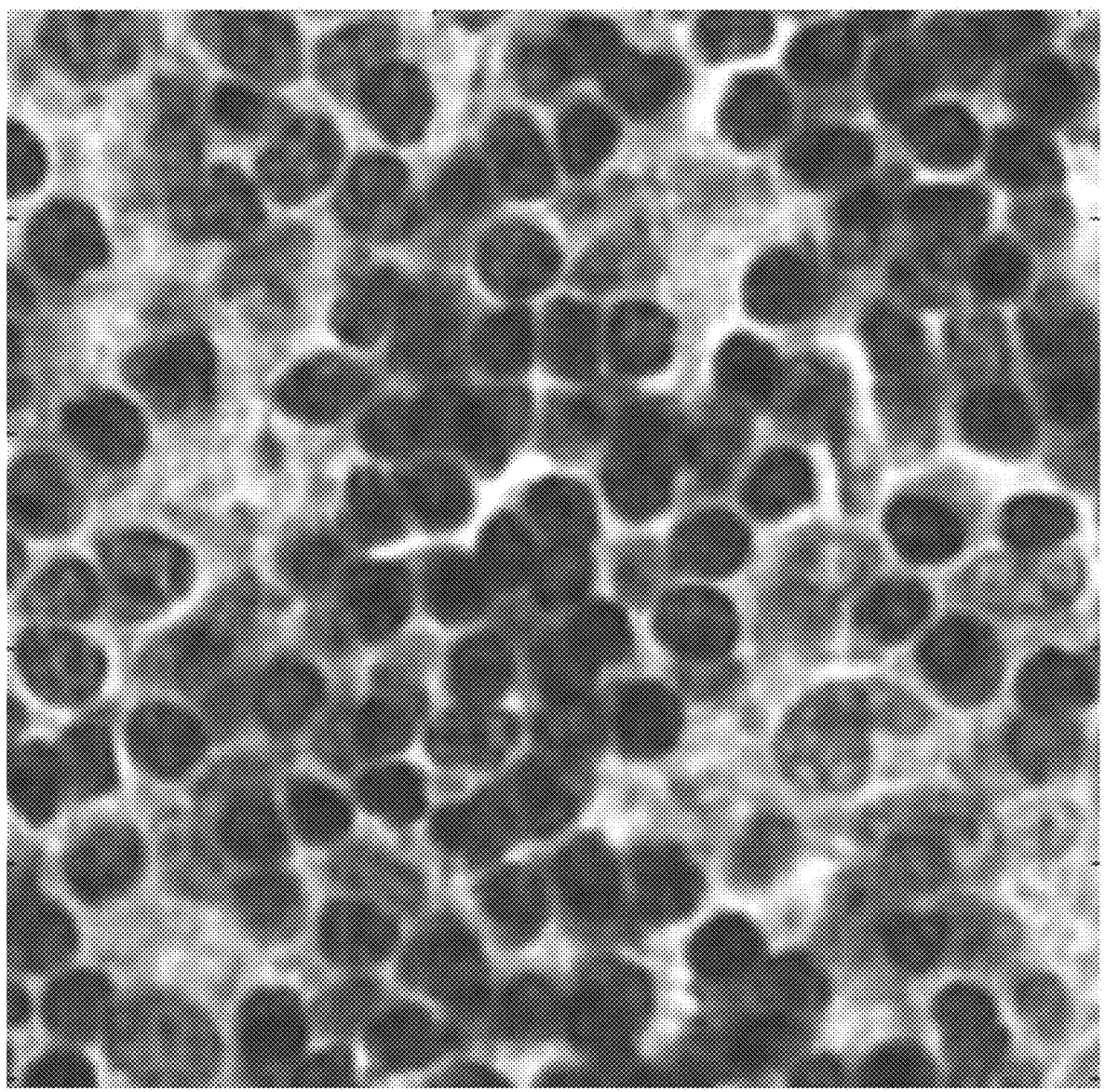
FIG. 7 illustrates a 256×256 pixel patch of tissue to be processed by an electronic device that implements one or more aspects of an embodiment of the invention.
Figure 8:
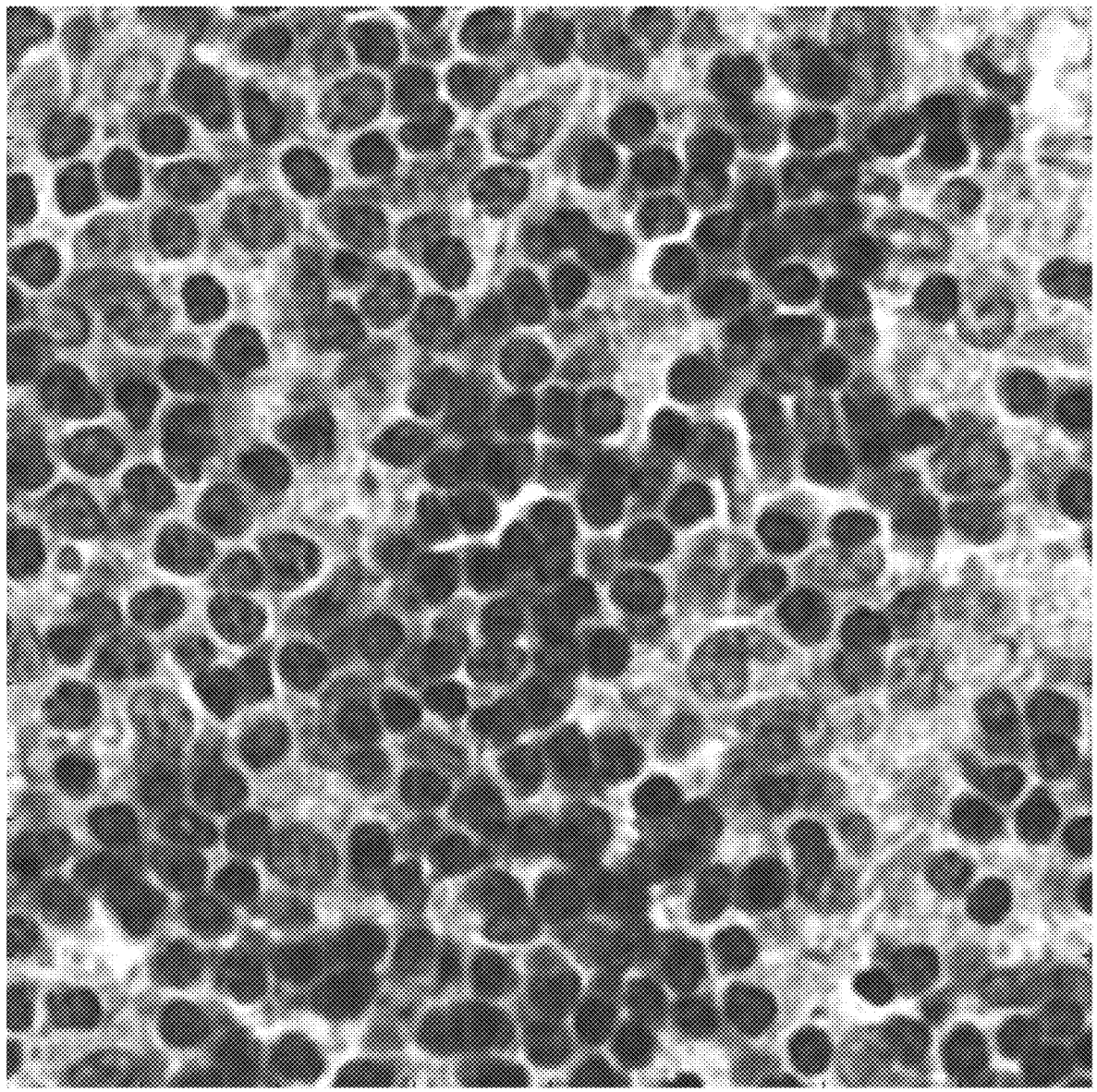
FIG. 8 illustrates a 400×400 pixel patch of tissue to be processed by an electronic device that implements one or more aspects of an embodiment of the invention

FIG. 6 shows a method for receiving a digital tissue image of a biological sample and determining the portions thereof likely to have cancer and the likelihood of particular regions within the sample having cancer. The method is performed using the trained classifier.

In step 601, the image processing engine 301 obtains access to a digital tissue image of a biological sample. The digital image may in various forms, for example, SVS, TIFF, VMS, VMU, NDPI, SCN, MRXS, SVSLIDE, BIF, PDF, JPG, BMP, GIF and any other digital image format. Moreover, the digital image may be located on a server (e.g., one or more servers 107-109), it may be a large image (many GB in size), the image may be stored in the cloud and all analysis in FIG. 6 may be performed in the cloud. The cloud may include servers 107-109. However, the steps of FIG. 6 may also be performed at one or more client devices 102-106 or a combination of servers 107-109 and/or client devices 102-106. The processing may be parallel and take place on multiple servers.

In step 603, tile generation engine 303 tiles the digital tissue image into a collection of image patches 307. Each tile/patch may be, for example, less than or equal to 1000×

1000 pixels, less than or equal to 400×400 pixels, less than or equal to 256×256 pixels or any other suitable number of pixels. The tiling step may be performed iteratively or in parallel by one or more computers. Tiling may include creating image patches that are of a uniform size and a uniform shape. The size of the patch may be a function of how the classifier was trained. For example, if the classifier/CNN was trained using 400×400 patches, the tile generation engine 303 may tile the image into same size (400×400) patches or, within 1%, 3%, 5%, 10%, 20%, 25%, or 30% of the size of patches using which the classifier was trained.

In step 603, the patches 307 may or may not be of a uniform size and shape. For example, one patch may be 400×400 and another patch may be 300×300 or 300×200. The patches also need not be squares, they may be rectangles, circles, ovals or more complex shapes. Various processes may be used for tiling such as Penrose tiling, bulk exclusion, and/or bound boxes.

In step 603, the generated patches may be overlapping or non-overlapping. That is, the same area of the digital image may or may not be included in more than one tile/patch.

In step 605, the patch identification engine 304 identifies/selects a set of target tissue patches from the tiled patches as a function of pixel content. For example, identification may include filtering the patches based on color channels of the pixels within the image patches. For example, the identification may be made as a function of the variance of the patches. The variance of the patches may be based on the variance of the Red Green Blue (RGB) channels and/or Hue, Saturation, Value (HSV) and/or Hue Saturation and/or Luminosity (HLS) and/or Hue Saturation Intensity (HIS) in a particular patch. This step helps insure that only patches that include cells are considered. Once step 605 is complete, only patches with cells are identified/selected. Such patches are shown in FIG. 9A (although no cells are shown in the patches of FIG. 9A, FIG. 9A is a representative diagram of patches and it is assumed that each patch in FIG. 9A in fact includes a plurality of stained cells).

In step 607, prior to sending the request to CNN 315, probability determination engine 305 may select a particular trained classifier from the a priori trained classifiers in CNN 315 according to classifier selection criteria defined according to biological sample metadata bound to the digital tissue image. The biological sample metadata includes digital information associated with at least one of the following: a tissue type, a tissue donor, a scanner, a stain, a staining technique, an identifier of a preparer, an image size, a sample identifier, a tracking identifier, a version number, a file type, an image date, a symptom, a diagnosis, an identifying information of treating physician, a medical history of the tissue donor, a demographic information of the tissue donor, a medical history of family of the tissue donor, and a species of the tissue donor. Multi-plex immune histo chemistry (IHC) may be used (for example, technology offered by PerkinElmer; see http://www.perkinelmer.com/lab-solutions). The IHC system allows for the generating of very complex digital images of tissues. The IHC system provides for the capturing of many different wavelengths of light from biotags that adhere to different types of cells. Once the slide is scanned, the system can synthetically re-create a desired stained slide. Thus, it is possible to use such a system to generate training data based on wavelength of light based on the biotag uses, the type of target cells (e.g., tumor cells, normal cells, T-Cells, NK cells, B-cells, etc.). Once trained, it is possible to then use the CNN 315 to identify regions of interest based on the biotags.

Figure 9A:
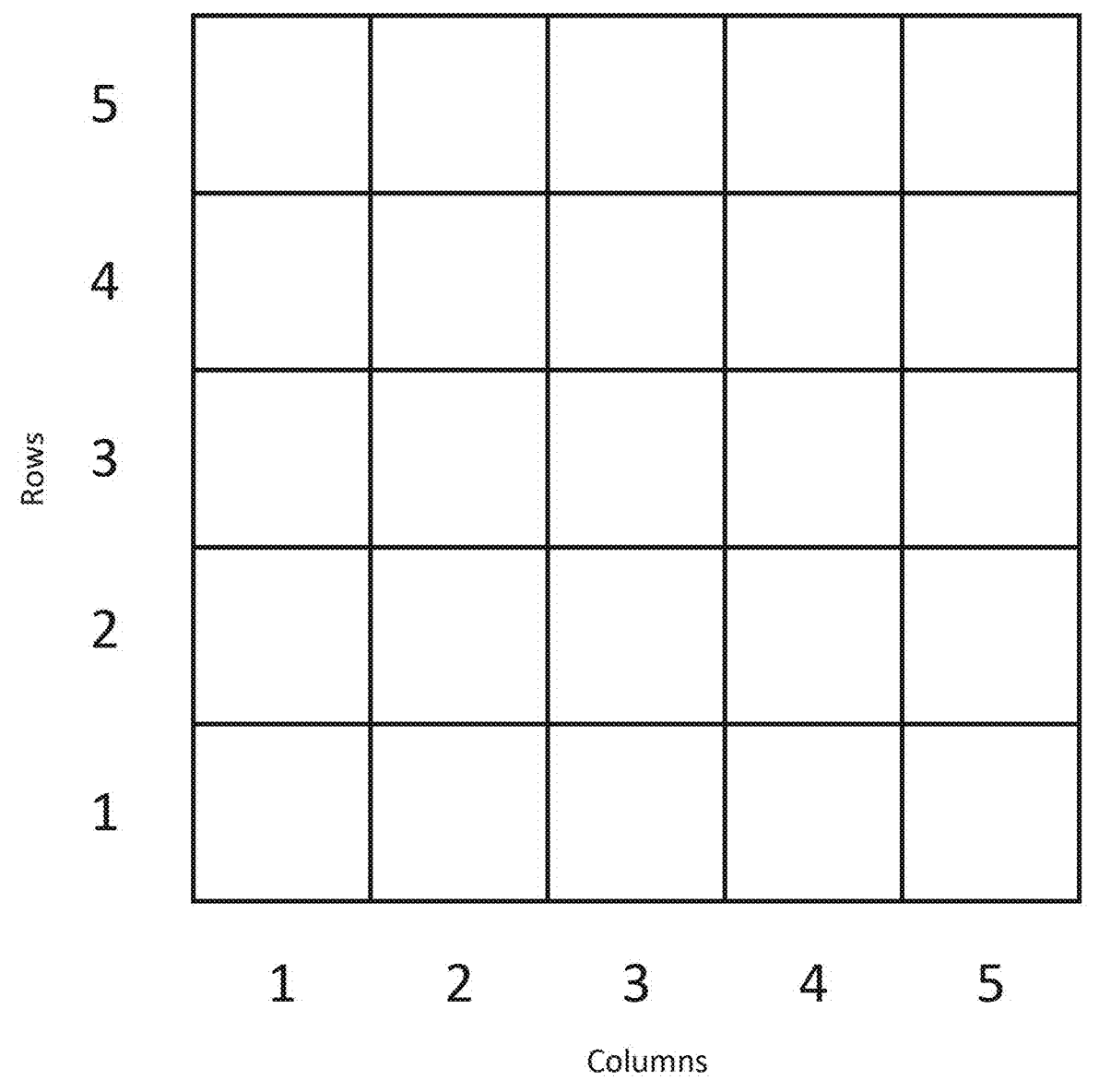

The probability determination engine 305 then transmits each patch in FIG. 9A to CNN 315 (which has been trained, and thus includes a database of a priori trained classifiers, as discussed above) with a request to assign an initial class probability score indicating a probability that the target tissue patch falls within a class of interest. The class of interest may include at least one of the following types of tissue: abnormal tissue, benign tissue, malignant tissue, bone tissue, skin tissue, nerve tissue, interstitial tissue, muscle tissue, connective tissue, scar tissue, lymphoid tissue, fat, epithelial tissue, nervous tissue, and blood vessels. The class of interest may also be either cancer or non-cancer (i.e., positive or normal). The class of interest may also be different types of cancers. That is, a probability (between 0 and 1) that the input patch is cancer (1 being 100% likelihood that the patch contains cancer and 0 being 0% likelihood of the patch contains cancer). The CNN 315 outputs the probability to probability determination engine 305. Although FIG. 3 shows direct communication between probability determination engine 305 and CNN 315, there may be multiple nodes between the two and the CNN may process the request using a plurality of servers, in series or in parallel.

FIG. 9B is a representative diagram showing the initial class probability scores of each of 25 representative patches, as determined by CNN 315 and communicated to probability determination engine 305 by CNN 315. In FIGS. 9A-9F, for ease of reference and description only, column and row numbers are labelled in the drawings so that each patch can be referred to by identifying the row and column number using the following notation: (column number, row number). As can be seen, for example, in FIG. 9B, the probability that patch (1, 1) includes cancer cells is 0.4, the probability that patch (2, 2) includes cancer is cells is 0.8, the probability that patch (5, 1) includes cancer is 0.05, the probability that patch (4, 2) includes cancer is 0.9 and so on. These probabilities are based on the likelihood that a particular patch has cancer cells in isolation and do not take into account the probabilities of any other patch in computing the probability of a particular patch. The initial class probabilities of each patch are stored in RAM or other memory.

In step 609, the classification engine 311 generates a first set of tissue region seed location patches by identifying target tissue patches having initial class probability scores that satisfy a first seed region criteria. This first seed region criteria may be considered a location criteria. For example, the criteria may be identifying any patches with an initial class probability of 0.9 and above. Using the initial class probabilities assigned in FIG. 9B, FIG. 9C shows the generated first set of tissue region seed patches. In particular, FIG. 9C shows that the generated first set of tissue region seed patches includes patch (2, 4), patch (3, 3), patch (3, 4), and patch (4, 2). The generated first set of tissue region seed patches are representatively indicated in FIG. 9C by underlining the initial class probability of the patch. The probabilities of the first set of tissue region seed patches is stored in RAM or other memory. The seed patches can be considered initial seed locations around which regions of interest are built.

In step 611, the classification engine 311 generates a second set of tissue region seed patches by identifying target tissue patches having initial class probability scores that satisfy a second seed region criteria. The processing of step 611 may be performed only near (i.e., within a predetermined number of neighbors from) the first set of tissue region patches generated in step 609. This second seed region criteria may be considered a shape criteria That is, the generated second set of tissue region seed patches will generally form a shape, which is often contiguous. For example, the criteria may be identifying any patches with an initial class probability of 0.5 and above (the second seed region criteria is generally lower than and easier to satisfy than the first seed region criteria). Using the initial class probabilities assigned in FIG. 9B, FIG. 9D shows the generated second set of tissue region seed patches. In particular, FIG. 9D shows that the generated second set of tissue region seed patches includes patch (1, 3), patch (2, 2), patch (2, 3), patch (2, 4), patch (3, 2), patch (3, 3), patch (3, 4), patch (4, 2), patch (4, 3), patch (5, 2) and patch (5, 3). The generated second set of tissue region seed patches are representatively indicated in FIG. 9D by showing the initial class probability of the generated patch in a larger font size. The second set of tissue region seed patches is stored in RAM or other memory.

In step 613, the classification engine 311 determines the regions of interest and calculates a region of interest score for each patch in the second set of tissue region seed patches (generated in step 611) as a function of initial class probability scores of neighboring patches of the second set of tissue region seed patches and a distance to patches within the first set of issue region seed patches. Neighboring patches may refer to a first neighbor (adjacent neighbors), second neighbor (one patch between second neighbor patches), a third neighbor (two patches between third neighbors), or any other level neighbor. A distance may be measured either in patches or in pixels. In this step, the classification engine 311 is refining the scores of each patch in the second set of tissue region seed patches based on neighbors.

A Region of Interest (ROI) 313 is a group of one or more connected patches. ROIs 313 may be calculated separately for the first set of tissue region seed patches, the second set of tissue region seed patches, or a combined set of first and second sets of tissue region seed patches. Two patches are connected if one of its 8 neighbors (4 edge neighbors and 4 corner neighbors assuming square or rectangular patches) are in the same set of tissue region seed patches. Patches may also be shapes other than square or rectangular. Patches may be, for example, polygonal, hexagonal (convex and concave), pentagonal, triangular, octagonal, nonagonal, circular, oval, trapezoidal, elliptical, irregular, and the like, Once one or more ROIs 313 are determined, a region of interest score ("ROI score") for each ROI 313 is calculated by classification engine 311. The ROI 313 score may be a function of the size of the ROI 313 (i.e., the number of patches or pixels that comprise the ROI). This scoring method leverages the fact that tumor cells tend to exist in groups. Thus, if a patch has a high probability of containing a tumor/cancer, and several of its neighbors also have a high probability of containing a tumor, it is more likely that this ROI is a tumor and the ROI score reflects this high probability.

In one embodiment of step 613, the classification engine 311 generates a list of ROIs from the first set of tissue region seed patches by grouping together connected neighbor patches and computing the centroid for each ROI 313. This results in a list of ROIs L_high. The classification engine 311 also generates a list of ROIs from the set the second set of tissue region seed patches by grouping together connected neighbor patches and computing the centroid for each ROI. This results in a list of ROIs L_low. Each of the ROIs in L_high is assigned a score as follows. If the size (number of patches) of a patch in L_high is 1, the ROI is assigned a score of 0.2; if the size is 2, the ROI is assigned a score of 0.3; if the size is 3, the ROI is assigned a score of 0.4; if the size is 4, the ROI is assigned a score of 0.5; if the size is 5, the ROI is assigned a score of 0.6; if the size is 6, the ROI is assigned a score of 0.7; if the size is 7, the ROI is assigned a score of 0.8; if the size is 8, the ROI is assigned a score of 0.9; and if the size is 9 or more, the ROI is assigned a score of 1.0. The above mapping is an example and a different mapping of size to score may be used (for example, as a function of the size of a patch).

Once the above initial scoring is performed, if an ROI in L_low is sufficiently close to an ROI in L_high, the classification engine 311 boosts the score of the ROI in L_high. This means that if patches with high probability (for example, >=0.9) are surrounded by (or near) patches with a lower but still significant tumor probability (for example, >=0.5), we have greater confidence that this ROI in L_high is a tumor. Sufficiently close may be defined as two ROIs where the distance between their centroids is less than a predetermined number of patches, for example, 5, or 6, or 7, or 8, or 9, or 10, or 11, or 12, or 13, or 14, or 15.

Score boosting is calculated as follows. If the size of the ROI in L_low that is sufficiently close to ROI in L_high is 5 patches, we boost the score of the ROI in L_high by 0.05, if the size is 10 patches, we boost the score of the ROI in L_high by 0.10 and if the size is 15 patches, we boost the score of the ROI in L_high by 0.15. Sizes between 5-10 and 10-15 are rounded to the nearest size with a defined score boost. The score has a ceiling of 1.0 (in case the score is boosted above 1.0). The final output may be the list of ROIs L_high, each with a centroid location and a score. The ROI(s) and score(s) may be rendered on a display.

The ROI(s) may demarcate different types of masks. The ROI(s) may include object foreground masks, used to separate foreground from background in images. The ROI(s) may include, for example, a tissue mask, demarcating areas of tissue and excluding areas without tissue. This may be used to concentrate processing resources to the tissue ROI. The ROI(s) may include a microdissection mask, which may be used in conducting a laser (or other type of) microdissection in order to excise a target ROI for further processing. Only certain ROIs may be used as a microdissection mask based on the size of the ROI and the quality of the ROI. That is, certain ROIs may not be suitable for microdissection (for example, ROIs that are too small overall or too narrow at certain points).

For example, as shown in FIG. 9E, there is a single ROI in L_high including patch (2, 4), patch (3, 3), patch (3, 4), and patch (4, 2). As shown in FIG. 9F, there is also a single ROI in L_low including patch (1, 3), patch (2, 2), patch (2, 3), patch (2, 4), patch (3, 2), patch (3, 3), patch (3, 4), patch (4, 2), patch (4, 3), patch (5, 2), and patch (5, 3).

The size (number of patches) of the ROI in L_high is 4 so the initial ROI score would be 0.5. However, based on the score boosting rules above, since the centroids of the ROIs in L_high and L_low are within 10 patches, and the size of the ROI in L_low is 11 (patch (1, 3), patch (2, 2), patch (2, 3), patch (2, 4), patch (3, 2), patch (3, 3), patch (3, 4), patch (4, 2), patch (4, 3), patch (5, 2) and patch (5, 3)) so, after rounding 11 down to 10, the score is boosted by 0.10 from 0.5 for a final score of 0.6.

In the alternative, the purpose served by steps 609, 611 and 613 can be more generally implemented using a conditional random field model, as shown in FIG. 10. The conditional random field model is a conditional probability distribution, where dependencies among the input variables do not need to be explicitly represented. This is in contrast to the explicit representation performed in steps 609, 611, and 613. The output of the conditional random field is a modified probability score that takes into account the input labels and the relational nature of the initial class probability scores. Specifically, the relational nature of the initial class probabilities is represented by $k(f_i, f_j)$ in FIG. 10, which would, for example, increase when input data $x_j$ is far away, both in terms of location (p) and feature (I), from $x_i$. Training of the conditional random field parameters in FIG. 10 is accomplished by minimizing $E(x)$ over the parameters w and θ, given the label data μ and input data for p and I. Inference on new data is accomplished using an iterative message passing algorithm. The modified probability scores can then be used to generate region of interest shapes and scores. It is noted that in FIG. 10, the symbol u in the bottom line ("u=1 if neighbor is different class . . . ") is referring to μ in the formula. This method is described in further detail in "Efficient Inference in Fully Connected CRFs with Gaussian Edge Potentials" by Philipp Krahenbuhl et al. (Advances in Neural Information Processing Systems 24 (2011) 109-117).

In step 615, the classification engine 311 generates region of interest shapes by grouping neighboring patches based on their region of interest scores.

Once the ROIs are calculated, the classification engine 311 generates region of interest shapes by grouping neighboring patches based on their region of interest scores.

Once the ROIs are established at the "patch layer" using the steps 609, 611 and 613 and/or the Conditional Random Field Model, additional processing may be performed at the "cell layer." In particular, for each boundary patch in a shape (i.e., connected patches of the second set of tissue region seed patches), the trained classifier of the CNN 315 is used to classify each cell in a patch as positive or negative using the classifier of CNN 315 if training information at the cell level is available (that is, if there exists an a priori database that was trained using cells (as opposed to patches)).

In particular, if the classifier of CNN 315 was trained on one cell patches (small patches that include a single cell or single cell with small portions of other cells and non-cells), cells are identified and a patch including a single cell are transmitted to the classifier of CNN 315 for classification and a probability of cancer is returned as output.

In the alternative, a fully convolutional neural network (FCNN) can be used on each boundary patch to identify the exact boundary line that differentiates tumor and non-tumor cells. In particular, the FCNN will output a pixel-wise prediction describing the probability of each pixel containing a tumor. During training, a FCNN will learn upsampling weights to transform activations into pixel-wise predictions. See "Fully Convolutional Networks for Semantic Segmentation" by Jonathan Long et al., including FIG. 1, showing pixel-wise prediction.

As a result of the above "cell layer" processing, some of the boundary patches of a shape that includes connected patches of the second set of tissue region seed patches will get smaller. For example, with reference to FIG. 9F, if the left half of patch (1, 3) includes non-cancer cells and the right half of patch (1, 3) includes cancer cells, following the "cell layer" processing, the shape would shrink and would no longer include the left half of patch (1, 3). Thus, the shape of the ROI would be refined by the "cell layer" processing.

Figure 11:
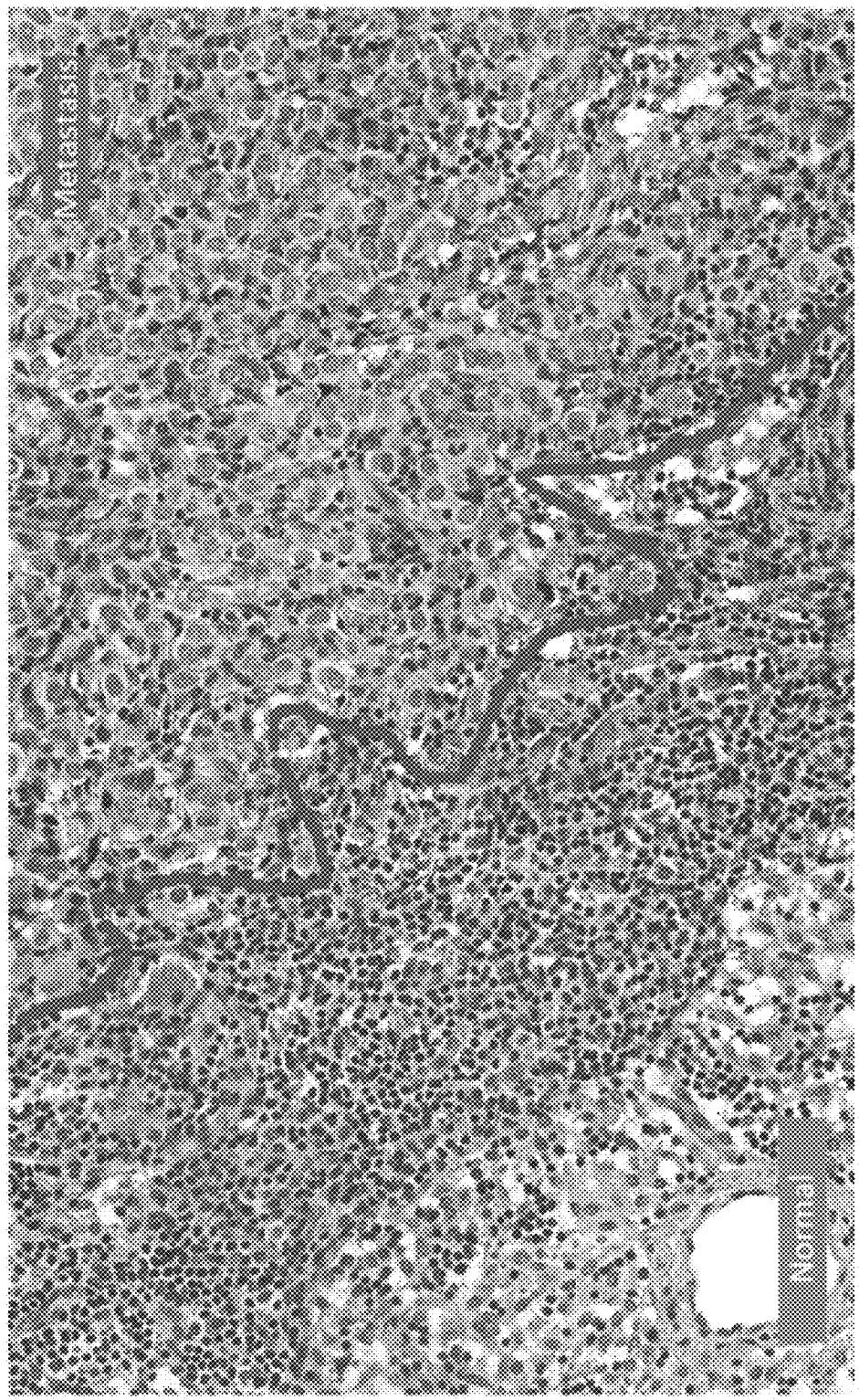
FIG. 11 illustrates a diagram showing a region of interest boundary generated by an electronic device that implements one or more aspects of an embodiment of the invention.

FIG. 11 illustrates a diagram showing a region of interest boundary generated by an electronic device that implements one or more aspects of an embodiment of the invention.

There may be other uses for technologies of embodiments of the present invention. For example, one such use may be detecting foreground as opposed to background objects. For example, the technology/system may be used in vehicle obstacle avoidance in an autonomous vehicle or partially autonomous vehicle. The CNN 315 may be trained using photographs taken by or in the vicinity of a vehicle in the process of being driven. The training would include such images being tiled into patches and each training patch would include data regarding whether the patch is in the foreground or background (e.g., 1.0 if background, 0.0 if foreground).

Once the CNN 315 is trained, it may then be used to determine whether objects in patches of images taken by or near a moving vehicle are in the background or foreground. The system may include a plurality of cameras mounted on the vehicle or in the vicinity (e.g., on signs, traffic lights, etc.) of the vehicle (and received in real time by the system via, for example, wireless telecommunication). The images may be processed by the system of the trained CNN 315 to determine whether patches of the images are in the background or foreground. That is, the system may recognize that a particular object is in the background such as grass, the sky, buildings, or the road. The system may also determine that an object is a large distance away from the vehicle. On the other hand, the system may determine that a particular object is in the foreground such as a nearby vehicle, pedestrian, or pothole. Determining what is in the foreground is useful in that a vehicle would then be able to determine that it needs to avoid objects in the foreground to avoid a collision but needs avoid objects in the background.

As discussed above, the CNN 315 may be trained on more than two classes/types of objects/images. That is, instead of training the CNN 315 on only two classes of patches (such as cancer/non-cancer, discussed in detail above), the CNN 315 may be trained using, for example, patches of cancer grades G1, G2, G3, G4 . . . GN. The CNN 315 would then be trained to identify the probability that a patch is in one of grades G1, G2, G3, G4 . . . GN. This may be accomplished by one of two methods. First, a discrete output method may be used. In the discrete output method, the architecture for the patch level classification is similar to that described above except the final (softmax) layer of the CNN 315, as shown in FIG. 5, would be changed from 2 classes to N classes, allowing the CNN 315 to be trained on N classes. In a case in which the N classes are non-ordered (for example, if the classes were animals such as dog, cat, pig, etc.), the system would return results for each of the N classes at step 607, and then iterate through steps 609, 611, 613, and 615 for each of the N classes.

As an alternative, the continuous output method may be used. In the continuous output method, regression may be used in the softmax layer instead of classification. An example of a regression may be a least square fitting or any curve fitting. For example, if there are 5 classes (cancer grades G1, G2, G3, G4, and G5) we may use a range of 0.0 to 5.0 to represent the classes. That is, for example, if the CNN 315 determines a patch as likely to be type G1, it may output a floating point number close to 1.0, if the CNN 315 determines a patch as likely to be type G2, it may output a floating point number close to 2.0, and so on. A value such as 2.1 would indicate that, although the patch is likely the type associated with 2 (G2), it is more likely 3.0 (G3) than 1.0 (G1). The continuous classification method is only used with ordered classes.

The system may also be used in land surveying. For example, the CNN 315 may be trained using images/patches of various land and/or water features (such as buildings, fields, rivers, lakes, etc.). Once the CNN 315 is trained, it may then receive and classify a plurality of aerial photographs and determine whether particular patches of images are lakes, rivers, fields, forests, roads and the like.

The system may also be used to determine whether a particular tooth contains cavities and/or an infection or other issue. The trained CNN 315 may receive as input one or more images of a tooth or multiple teeth from one or more angles and/or X-Rays from one or more angles. The system may then determine, by using the trained CNN 315, whether the several patches of such images and/or X-Rays are likely to include cavities.

The system may also be used to analyze X-Rays, MRIs, CTs and the like. For example, the system may be trained on fractured vs. non-fractured bones and determine whether, for example, an X-Ray image includes a fractured bone. The system may be similarly trained on MRI and/or CT output.

The CNN 315 may also be trained on skin diseases such as melanoma. The CNN 315 may be trained with positive (melanoma) and non-melanoma (normal) patches and then, once trained, determine whether a section of a skin biopsy or photograph of the skin may is likely to include melanoma.

The CNN 315 may also be trained on objects in video games. Each frame of a rendered video game may have foreground objects and a background scene. The CNN 315 can be trained to differentiate between the two, as discussed above. The system may also be used to create masks for Augmented Reality (AR) games. For example, a region around a point of interest (e.g., landmark, etc.) may be identified. This region can then be masked out and replaced with AR content or other overlay. Moreover, an AI process may be created that learns to play a game based on the regions of interest. The AT process then becomes a non-player entity in a game to challenge a player.

While certain illustrative embodiments are described herein, it should be understood that those embodiments are presented by way of example only, and not limitation. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

What is claimed is:

1. A computer implemented method of generating at least one shape of a region of interest in a digital image, the method comprising:
    obtaining, by an image processing engine, access to a digital tissue image of a biological sample;
    tiling, by the image processing engine, the digital tissue image into a collection of image patches;
    identifying, by the image processing engine, a set of target tissue patches from the collection of image patches as a function of pixel content within the collection of image patches;
    assigning, by the image processing engine, each target tissue patch of the set of target tissue patches an initial class probability score indicating a probability that the target tissue patch falls within a class of interest, the initial class probability score generated by a trained classifier executed on each target tissue patch;
    generating, by the image processing engine, a first set of tissue region seed patches by identifying target tissue patches having initial class probability scores that satisfy a first seed region criteria, the first set of tissue region seed patches comprising a subset of the set of target tissue patches;
    generating, by the image processing engine, a second set of tissue region seed patches by identifying target tissue patches having initial class probability scores that satisfy a second seed region criteria, the second set of tissue region seed patches comprising a subset of the set of target tissue patches;
    calculating, by the image processing engine, a region of interest score for each patch in the second set of tissue region seed patches as a function of initial class probability scores of neighboring patches of the second set of tissue region seed patches and a distance to patches within the first set of issue region seed patches; and
    generating, by the image processing engine, one or more region of interest shapes by grouping neighboring patches based on their region of interest scores.

2. The method of claim 1, wherein the step of tiling the digital tissue image includes creating image patches that are of a uniform size and a uniform shape.

3. The method of claim 2, wherein the image patches of uniform size and uniform shape include square patches of less than or equal to 1,000 pixels by 1,000 pixels.

4. The method of claim 3, wherein the square patches are less than or equal to 400 pixels by 400 pixels.

5. The method of claim 4, wherein the square patches are less than or equal to 256 pixels by 256 pixels.

6. The method of claim 1, wherein the step of tiling the digital tissue image includes creating image patches that are of non-uniform size and shape.

7. The method of claim 1, wherein the collection of image patches includes non-overlapping patches.

8. The method of claim 1, wherein the step of identifying the set of target tissue patches includes filtering the collection of image patches based on color channels of pixels within the image patches.

9. The method of claim 8, further comprising filtering image patches of the collection of image patches as a function of variance with respect to the color channels.

10. The method of claim 1, wherein the trained classifier includes a trained neural network.

11. The method of claim 1, wherein the trained classifier includes a trained implementation of at least one of the following types of classifiers: support vector machine, softmax, decision tree, random forest, k nearest neighbor, Linear and Quadratic Discriminant Analysis, Ridge Regression, Multilayer Perceptron (MLP), Hyper-pipes, Bayes net, k-means clustering and naïve bayes.

12. The method of claim 1, further comprising causing a computing device to render the region of interest shapes on a display.

13. The method of claim 1, wherein the region of interest shapes includes at least one tissue mask.

14. The method of claim 13, wherein the at least one tissue mask comprises a microdissection mask.

15. The method of claim 1, wherein the class of interest comprises at least one cancer class.

16. The method of claim 15, wherein the at least one cancer class includes one of the following types of cancer: breast cancer, bladder cancer, brain cancer, lung cancer, pancreatic cancer, skin cancer, colorectal cancer, prostate cancer, stomach cancer, liver cancer, cervical cancer, esophageal cancer, leukemia, non-hodgkin lymphoma, kidney cancer, uterine cancer, bile duct cancer, bone cancer, ovarian cancer, gallbladder cancer, gastrointestinal cancer, oral cancer, throat cancer, ocular cancer, pelvic cancer, spinal cancer, testicular cancer, vaginal cancer, vulvar cancer, and thyroid cancer.

17. The method of claim 1, wherein the class of interest comprises at least one of the following types of tissue: abnormal tissue, benign tissue, malignant tissue, bone tissue, skin tissue, nerve tissue, interstitial tissue, muscle tissue, connective tissue, scar tissue, lymphoid tissue, fat, epithelial tissue, nervous tissue, and blood vessels.

18. The method of claim 1, wherein the digital tissue image comprises a slide image of a tissue sample slide.

19. The method of claim 18, wherein the slide image comprises a digital histopathology image.

20. The method of claim 1, further comprising obtaining access to a database of a priori trained classifiers.

21. The method of claim 20, further comprising selecting the trained classifier from the a priori trained classifiers according to classifier selection criteria defined according to biological sample metadata bound to the digital tissue image.

22. The method of claim 21, wherein the biological sample metadata includes digital information associated with at least one of the following: a tissue type, a tissue donor, a scanner, a stain, a staining technique, an identifier of a preparer, an image size, a sample identifier, a tracking identifier, a version number, a file type, an image date, a symptom, a diagnosis, an identifying information of treating physician, a medical history of the tissue donor, a demographic information of the tissue donor, a medical history of family of the tissue donor, and a species of the tissue donor.

23. The method of claim 1, wherein calculating a region of interest score for each patch in the second set of tissue region seed patches as a function of neighboring patches includes calculating a conditional random field (CRF) among the neighboring patches.

24. The method of claim 1, wherein calculating a region of interest score for each patch in the second set of tissue region seed patch as a function of neighboring patches includes evaluating nearest neighbors.

25. The method of claim 1, wherein the region of interest shapes includes shapes composed of patches.

26. The method of claim 1, wherein the region of interest shapes comprise shape sub-patch level features.

27. The method of claim 26, wherein the image data comprises tissue image data and the region of interest shapes comprise sub-patch level shapes at the cell level.

28. The method of claim 26, wherein the step of generating the region of interest shapes includes classifying cells by cell-type within patches in the second set of tissue region seed patches according to a cell-level trained neural network.

29. The method of claim 27, wherein the step of generating the region of interest shapes includes delineating a boundary between cells via a trained fully convolutional neural network.

30. The method of claim 29, wherein the trained fully convolutional neural network is trained at a patch level on known cell types within training patches.

31. The method of claim 1, wherein the assigning the initial class probability score of a target tissue patch is performed without consideration of the initial class probability of any other patch of the set of target tissue patches.

32. The method of claim 1, wherein neighboring patches of the second set of tissue region seed patches comprises one or more patches adjacent to at least one patch of the second set of tissue region seed patches.

33. The method of claim 1, further comprising, training the trained classifier by a method comprising:
receiving, by a convolutional neural network, a plurality of patches of digital tissue images, the plurality of patches including a plurality of normal patches and a plurality of positive patches;
setting, by the convolutional neural network, an input size of one or more fully connected layers of an architecture of the convolutional neural network to a new value, the new value being determined based on a cardinality of types of patches in the plurality of patches;
populating, by the convolutional neural network, a distribution of values of parameters of the one or more fully connected layers;
adjusting, by the convolutional neural network, the values of the parameters of the one or more fully connected layers;
assigning, by the convolutional neural network, an initial class probability score to each of the plurality of patches, the initial class probability score indicating a probability that the target tissue patch falls within a group of normal patches or a group of positive patches; and
determining whether first initial class probability scores of the plurality of patches are more accurate than second initial class probability scores of the plurality of patches.

34. The method of claim 33, wherein the plurality of digital tissue images includes a cardinality of normal patches that is substantially similar to a cardinality of positive patches.

35. The method of claim 33, wherein the determining that the first initial class probability scores of the plurality of patches are more accurate than the second initial class probability scores of the plurality of patches comprises determining that a sum of squares of a difference between the first initial class probability scores of the plurality of patches and correct initial class probability scores of the plurality of patches is lower than a sum of squares of a difference between the second initial class probability scores of the plurality of patches and the correct initial class probability scores of the plurality of patches.

36. The method of claim 35, wherein the assignment of the second initial class probability scores of the plurality of patches occurs earlier than the assignment of the first initial class probability scores of the plurality of patches.

37. The method of claim 33, wherein the one or more fully connected layers comprise a softmax layer.

38. The method of claim 33, wherein the types of patches are the normal patches and the positive patches.

39. The method of claim 33, wherein the new value comprises 1×1×2.

40. The method of claim 33, wherein the distribution of values of parameters of the one or more fully connected layers is a Gaussian distribution.

41. A computer implemented method of generating at least one shape of a region of interest in a digital image, the method comprising:
obtaining, by an image processing engine, access to a digital tissue image of a biological sample;
tiling, by the image processing engine, the digital tissue image into a collection of image patches, the collection of image patches comprising a set of target tissue patches;
assigning, by the image processing engine, each target tissue patch of the set of target tissue patches an initial class probability score indicating a probability that the target tissue patch falls within a class of interest, the initial class probability score generated by a trained classifier executed on each target tissue patch;

generating, by the image processing engine, a first set of tissue region seed patches by identifying target tissue patches having initial class probability scores that satisfy a first seed region criteria, the first set of tissue region seed patches comprising a subset of the set of target tissue patches;

generating, by the image processing engine, a second set of tissue region seed patches by identifying target tissue patches having initial class probability scores that satisfy a second seed region criteria, the second set of tissue region seed patches comprising a subset of the set of target tissue patches;

calculating, by the image processing engine, a region of interest score for each patch in the second set of tissue region seed patches as a function of initial class probability scores of neighboring patches of the second set of tissue region seed patches and a distance to patches within the first set of issue region seed patches; and generating, by the image processing engine, one or more region of interest shapes by grouping neighboring patches based on their region of interest scores.

42. A computer implemented method of generating at least one shape of a region of interest in a digital image, the method comprising:

obtaining, by an image processing engine, access to a digital tissue image of a biological sample;

tiling, by the image processing engine, the digital tissue image into a collection of image patches;

obtaining, by the image processing engine, a plurality of features from each patch in the collection of image patches, the plurality of features defining a patch feature vector in a multidimensional feature space including the plurality of features as dimensions;

assigning, by the image processing engine, each patch in the collection of image patches an initial class probability score indicating a probability that the patch falls within a class of interest, the initial class probability score generated by a trained classifier executed on each patch in the collection of image patches using the plurality of features of each patch in the collection of image patches;

generating, by the image processing engine, a first set of tissue region seed patches by identifying patches in the collection of image patches having initial class probability scores that satisfy a first criteria;

generating, by the image processing engine, a second set of tissue region seed patches by identifying patches in the collection of image patches having initial class probability scores that satisfy a second criteria; and generating, by the image processing engine, one or more region of interest shapes as a function of, for each patch in the collection of image patches, its inclusion in the first set of tissue region seed patches and the second set of tissue region seed patches.

43. A digital image region of interest generation system, the system comprising:

a database configured to store a digital tissue image of a biological sample;

an image processing engine configured to:

obtain access to the digital tissue image of the biological sample;

tile the digital tissue image into a collection of image patches;

identify a set of target tissue patches from the collection of image patches as a function of pixel content within the collection of image patches;

assign each target tissue patch of the set of target tissue patches an initial class probability score indicating a probability that the target tissue patch falls within a class of interest, the initial class probability score generated by a trained classifier executed on each target tissue patch;

generate a first set of tissue region seed patches by identifying target tissue patches having initial class probability scores that satisfy a first seed region criteria, the first set of tissue region seed patches comprising a subset of the set of target tissue patches;

generate a second set of tissue region seed patches by identifying target tissue patches having initial class probability scores that satisfy a second seed region criteria, the second set of tissue region seed patches comprising a subset of the set of target tissue patches;

calculate a region of interest score for each patch in the second set of tissue region seed patches as a function of initial class probability scores of neighboring patches of the second set of tissue region seed patches and a distance to patches within the first set of issue region seed patches; and generate one or more region of interest shapes by grouping neighboring patches based on their region of interest scores.

44. A digital image region of interest generation system, the system comprising:

a database configured to store a digital tissue image of a biological sample;

an image processing engine configured to:

obtain access to the digital tissue image of the biological sample from the database;

tile the digital tissue image into a collection of image patches;

obtain a plurality of features from each patch in the collection of image patches, the plurality of features defining a patch feature vector in a multidimensional feature space including the plurality of features as dimensions;

assign each patch in the collection of image patches an initial class probability score indicating a probability that the patch falls within a class of interest, the initial class probability score generated by a trained classifier executed on each patch in the collection of image patches using the plurality of features of each patch in the collection of image patches;

generate a first set of tissue region seed patches by identifying patches in the collection of image patches having initial class probability scores that satisfy a first criteria;

generate a second set of tissue region seed patches by identifying patches in the collection of image patches having initial class probability scores that satisfy a second criteria; and generate one or more region of interest shapes as a function of, for each patch in the collection of image patches, its inclusion in the first set of tissue region seed patches and the second set of tissue region seed patches.

* * * * *